US008746460B2

(12) United States Patent
Vasshus et al.

(10) Patent No.: US 8,746,460 B2
(45) Date of Patent: Jun. 10, 2014

(54) APPARATUS FOR SIEVING AND FLUID SEPARATION AND A METHOD OF USING SAME

(75) Inventors: Jan Kristian Vasshus, Sandnes (NO); Trond Melhus, Sandnes (NO)

(73) Assignee: Cubility AS, Sandnes (NO)

( * ) Notice: Subject to any disclaimer, the term of this patent is extended or adjusted under 35 U.S.C. 154(b) by 1258 days.

(21) Appl. No.: 11/994,154

(22) PCT Filed: Jun. 26, 2006

(86) PCT No.: PCT/NO2006/000243
§ 371 (c)(1),
(2), (4) Date: Jan. 18, 2008

(87) PCT Pub. No.: WO2007/004889
PCT Pub. Date: Jan. 11, 2007

(65) Prior Publication Data
US 2008/0223777 A1    Sep. 18, 2008

(30) Foreign Application Priority Data

Jun. 30, 2005 (NO) .................................... 20053230

(51) Int. Cl.
*B01D 43/00*    (2006.01)
(52) U.S. Cl.
USPC ........... 210/400; 210/384; 210/401; 210/406; 210/499
(58) Field of Classification Search
USPC .......... 209/307, 309, 320; 210/384, 400–404, 210/406, 499
See application file for complete search history.

(56) References Cited

U.S. PATENT DOCUMENTS

| 1,013,040 | A | * | 12/1911 | Morse ........................... 209/307 |
| 3,864,249 | A | | 4/1975 | Wallis |
| 4,153,550 | A | * | 5/1979 | Lautrette ....................... 210/770 |
| 4,255,269 | A | * | 3/1981 | Timmer ......................... 175/66 |
| 4,289,614 | A | | 9/1981 | Suzuki |
| 4,350,591 | A | | 9/1982 | Lee |
| 4,639,258 | A | | 1/1987 | Schellstede et al. |
| 4,750,920 | A | | 6/1988 | Manuel et al. |
| 6,110,367 | A | * | 8/2000 | Jensen et al. .................. 210/297 |
| 6,622,870 | B1 | * | 9/2003 | Prinssen ....................... 210/398 |

(Continued)

FOREIGN PATENT DOCUMENTS

| CA | 2445067 | 4/2005 |
| DE | 2115363 | 10/1972 |

(Continued)

OTHER PUBLICATIONS

Written Opinion, Oct. 4, 2006, PCT Office.

(Continued)

*Primary Examiner* — Tony G Soohoo
*Assistant Examiner* — Peter Keyworth
(74) *Attorney, Agent, or Firm* — GableGotwals (57) ABSTRACT

The present invention describes an apparatus (1) for the sieving and fluid separation of a material containing fractions of a solid and fluid, the material being placed on an upper side of at least one sieving element (13), and the apparatus (1) being provided with at least one fluid-flow-generating device (5) for the production of a fluid flow through a portion of the material-carrying sieving element (13). The invention also describes a method of using the apparatus (1).

15 Claims, 5 Drawing Sheets

(56) References Cited

U.S. PATENT DOCUMENTS

| | | | |
|---|---|---|---|
| 2002/0000399 A1 | 1/2002 | Winkler et al. | |
| 2004/0206709 A1* | 10/2004 | Buisman et al. | 210/783 |
| 2005/0006149 A1 | 1/2005 | Tettleton | |
| 2005/0082234 A1* | 4/2005 | Solenthaler | 210/748 |
| 2005/0109704 A1* | 5/2005 | Doxey et al. | 210/739 |

FOREIGN PATENT DOCUMENTS

| | | |
|---|---|---|
| EP | 0652810 | 5/1995 |
| EP | 1184089 | 3/2002 |
| GB | 995764 | 6/1965 |
| GB | 1399938 | 7/1975 |
| GB | 2085750 | 5/1982 |
| NO | 303323 | 9/1997 |
| NO | 308649 | 5/1999 |
| NO | 319329 | 5/2000 |
| WO | WO90/13347 | 11/1990 |
| WO | WO 99/15758 | 4/1999 |

OTHER PUBLICATIONS

Ramteck Environmental Services, Breakthrough technology in industrial and environmental fluid processing, 1987 Ramteck Systems, Inc.; 2 pages.

The Max System: Breakthrough technology in drilling fluid processing, 1985 Ramteck Systems, Inc.; 4 pages.

* cited by examiner

APPARATUS FOR SIEVING AND FLUID SEPARATION AND A METHOD OF USING SAME

CROSS-REFERENCE TO PENDING APPLICATIONS

This application is based on and claims the priority of PCT Patent Application No. NO2006/000243, filed on Jun. 26, 2006, which was based on and claims the priority of Norwegian Patent Application No. 20053230, filed on Jun. 30, 2005.

The present invention relates to an apparatus for sieving and fluid separation. More particularly, it relates to an apparatus and a method for sieving a material such as, but not limited to, a drilling fluid containing drilling mud and drilled particles or cuttings, and separating liquid and gas which are liberated from the material.

The separation of solid particles from fluid flows by passing a fluid through a filter or sieving device having perforations, which are of such a size that the solid particles are retained on the sieve surface rather than passing through it, is a well-known technique. Some fluid flows contain other substances, which make solid particles agglomerate or adhere together or adhere to a sieve surface, which leads to the formation of bridges across the sieve openings, and the sieve clogs up. Such problems often arise in well drilling, in which a drilling fluid or "mud" is circulated down into the well.

During the drilling work drilling fluid is continuously circulated between the borehole and the surface to remove drilled particles, also called cuttings, from the drill bit. The cuttings are carried with the drilling mud to the surface, where the cuttings are separated from the drilling mud. The drilling mud is then recirculated into the well for the drilling work. Due to, among other things, the fact that the drilling mud is expensive, it is desirable for as much of it as possible to be reused. The drilling mud is kept as clean and free of contamination of cuttings and foreign bodies as possible. Drilling mud is typically cleaned by means of several types of separate equipment incorporated in a process chain, including vibrating sieving devices, normally called "shale shakers" or "shakers" and degassing units or so-called "degassers".

When drilling though sections of sandstone formations there is used a drilling fluid of so high a viscosity that conventional sieving apparatuses do not provide enough gravitational forces for the drilling mud to be separated from the solid particles. This is due to, among other things, the fact that the bonds between the drilling mud and the solid particles and the bonds between the drilling mud and the sieving device, for example the sieving cloth, in the sieving apparatus are too strong.

There are several drawbacks related to the above-mentioned prior art.

Conventional shale shakers, in which the material which is to be sieved, is passed across a sieving cloth fixedly clamped in a frame which is subjected to shaking motion, for example by means of an offset clump weight, are very noisy and, in addition, transmit substantial vibrations to the base of the device. Due to the fact that the sieving effect is achieved by the sieving cloth being moved relative to the material to be sieved, in both the horizontal plane and the vertical plane, the sieving cloth is subjected to considerable wear and, because of that, has to be replaced relatively frequently. Such a replacement of sieving cloth is a relatively time-consuming task. If there are not any alternative sieving devices available, the materials to be sieved must be stored temporarily while the replacing of the sieving cloth takes place.

When sieving drilling fluid from a petroleum well there will be evaporation of substances unfavourable to health and environment. When shale shakers are used, such evaporation will be to the immediate environment of the sieving apparatus because it is not practically feasible to encapsulate the sieving device. Personnel that have to stay at the sieving device could thereby be exposed to evaporations injurious to health.

The invention has as its object to remedy or at least reduce one or more drawbacks of the prior art.

The object is achieved through features as specified in the description below and in the subsequent claims.

In this document positional specifications such as "upper" and "lower", "bottom" and "top" or "horizontal" and "vertical" refer to the position of the apparatus in the figures that follow, which is also a natural, necessary or practical functional position.

Surprisingly, it has been found that if a fluid flow is passed through the drilled material and further through the sieving device, a far more efficient separation is achieved between the drilling mud and drilled particles and the drilling mud and the sieving device or sieving cloth. Further, it has been found that it is advantageous that such a fluid flow is produced by means of a suction device, which is placed at an underside of the sieving cloth on which the drilled material is placed. Even if an air current could also be applied through a nozzle as pressurized air from above the drilled material, blowing towards it, such a solution is unfavourable as, in such a case, the drilled material on the sieving device would have to be arranged in a layer of even thickness which would have to be adjusted to the position of the nozzle relative to the sieving device. This could complicate the device, which is not very desirable from a maintenance point of view, among other things.

In one aspect the present invention is constituted by an apparatus for the sieving and fluid separation of a material containing fractions of a solid and fluid, the material being placed on an upper side of a sieving element, and the apparatus being provided with at least one fluid-flow-generating device for producing a fluid flow through a portion of the fluid-carrying sieving element.

In a preferred embodiment the fluid flow has moving direction from the upper side of the sieving element and through said portion of the sieving element. By the upper side is meant, in this connection, the side of the sieving element on which is placed the material, which is being sieved.

In a preferred embodiment the at least one fluid-flow-generating device includes a suction nozzle, which is in fluid communication with at least one vacuum-generating device through a pipe arrangement, a portion of the suction nozzle being moved up towards an underside of the sieving element. In one embodiment the vacuum-generating device is constituted by a vessel, which is in fluid communication with at least one vacuum pump known per se. With the exception of associated pipe systems, the vessel is preferably fluid-tight and will, therefore, be referred to, in what follows, as a fluid-tight vessel. The fluid-tight vessel is preferably in fluid communication with the suction nozzle. Thus, it is the underpressure produced in said fluid-tight vessel by means of said at least one vacuum pump that produces fluid flow into the suction nozzle. The fluid which is drawn out of the particulate material present on the sieving element is constituted substantially by liquids and gases. These liquids and gases become mixed with, for example, air, which is supplied to the apparatus at a rate substantially corresponding to the rate at which the vacuum pump removes air from the apparatus and in such a way that the desired underpressure in the apparatus is achieved. In one embodiment the apparatus is supplied with air through at least a feeding portion for the drilled material. To facilitate the separation of the gases and liquids of the fluid, in a preferred embodiment the fluid-tight vessel is provided with at least one separating device known per se, such as, but not exclusively, a separator plate, the purpose of which is, among other things, to reduce the velocity of the fluid in said fluid-tight vessel. Due to the different specific gravities of the gases and liquids, the gases may be brought out of the vessel and to further treatment from an upper portion of the vessel, whereas the liquids could be pumped out of the vessel and to further treatment from a lower portion of the vessel. Thus, fluid, which is drawn out of the particulate material present on the sieving element could be passed on, in a fully controlled manner, in the form of gas/vapour and liquid for recycling or controlled disposal. This eliminates, among other things, the problem of exposure of personnel to evaporation from the drilled material unfavourable to health.

In one embodiment the sieving element is constituted by at least one endless band or sieving cloth, which is arranged in a manner known per se to be moved around at least two rollers or drums which are placed substantially parallel to each other and spaced apart. At their end portions, the rollers are preferably connected to a sieve-tightening device known per se, which is arranged to adjust the spacing of the rollers in order, thereby, to provide selective adjustment of the tightening of the sieving element. In a preferred embodiment the sieving apparatus is further provided with a stationary sieving element arranged to receive the material to be sieved. When the material is placed on said stationary sieving element, some of the material will be sieved before being transferred to said endless sieving element for further sieving.

A driving device known per se is connected to at least one of the rollers in order to rotate it and thereby the sieving element.

In a preferred embodiment two or more sieving apparatuses are arranged to be placed at least partially overlapping in the vertical plane. In such an embodiment the individual apparatus may advantageously be provided with sieving elements with different mesh openings, the mesh openings of a sieving element for a lower sieving apparatus being smaller than the mesh openings of the sieving element for an upper sieving apparatus in a manner known per se.

In one embodiment the apparatus is further provided with at least one oscillator, known per se, which is preferably placed in contact with a portion of the sieving element. The oscillator is arranged to transmit oscillations towards a portion of an underside of the sieving element. In one embodiment the oscillator is placed at a portion of the suction nozzle. Trials have shown that the at least one oscillator is effective for facilitating the release of liquid which has not been released from the sieving element by means of the fluid flow and which is still on the sieving element.

In one embodiment at least a portion of the sieving element is further influenced by high frequency oscillations. In a preferred embodiment the high frequency oscillations are produced by an acoustic sound source. The acoustic sound source is preferably constituted by an ultrasound source arranged as, for example, but not limited to, that described in the Norwegian patent application NO 20051433 belonging to the present applicant and included in its entirety in this application.

In a preferred embodiment the sieving apparatus is provided with a cleaning device, which is arranged to release particles which do not fall off the sieving element under the influence of gravitational forces alone. In one embodiment the cleaning device includes nozzles, from which a fluid flow is released, which is passed through the sieving element, preferably when this is close to said rollers. The fluid used for this cleaning process is preferably, but not necessarily, recovered from the interior of the sieving device.

In another aspect of the invention there is provided a method of sieving and degassing a material, which is placed on the upper side of a sieving element. The material which contains fractions of a solid and fluid, and which is located on a portion of the sieving element, is influenced by a fluid flow produced by a fluid-flow-generating device.

In what follows is described a non-limiting exemplary embodiment of a preferred embodiment which is visualized in the accompanying drawings, in which like or corresponding parts are substantially indicated by the same reference numerals, and in which.

As already mentioned, in what follows, like parts are referred to by the same reference numerals. For clarity, in some of the figures identical devices are indicated by the reference numeral of just one of said devices.

In the figures the reference numeral 1 identifies a sieving and fluid separation apparatus, which is arranged, for example, but not exclusively, to separate drilled particles from drilling mud. In what follows, the sieving and fluid separation apparatus 1 will also be referred to only as apparatus 1.

The apparatus 1 includes a sieving unit 3 and a fluid separation unit 5 connected thereto.

Figure 1:
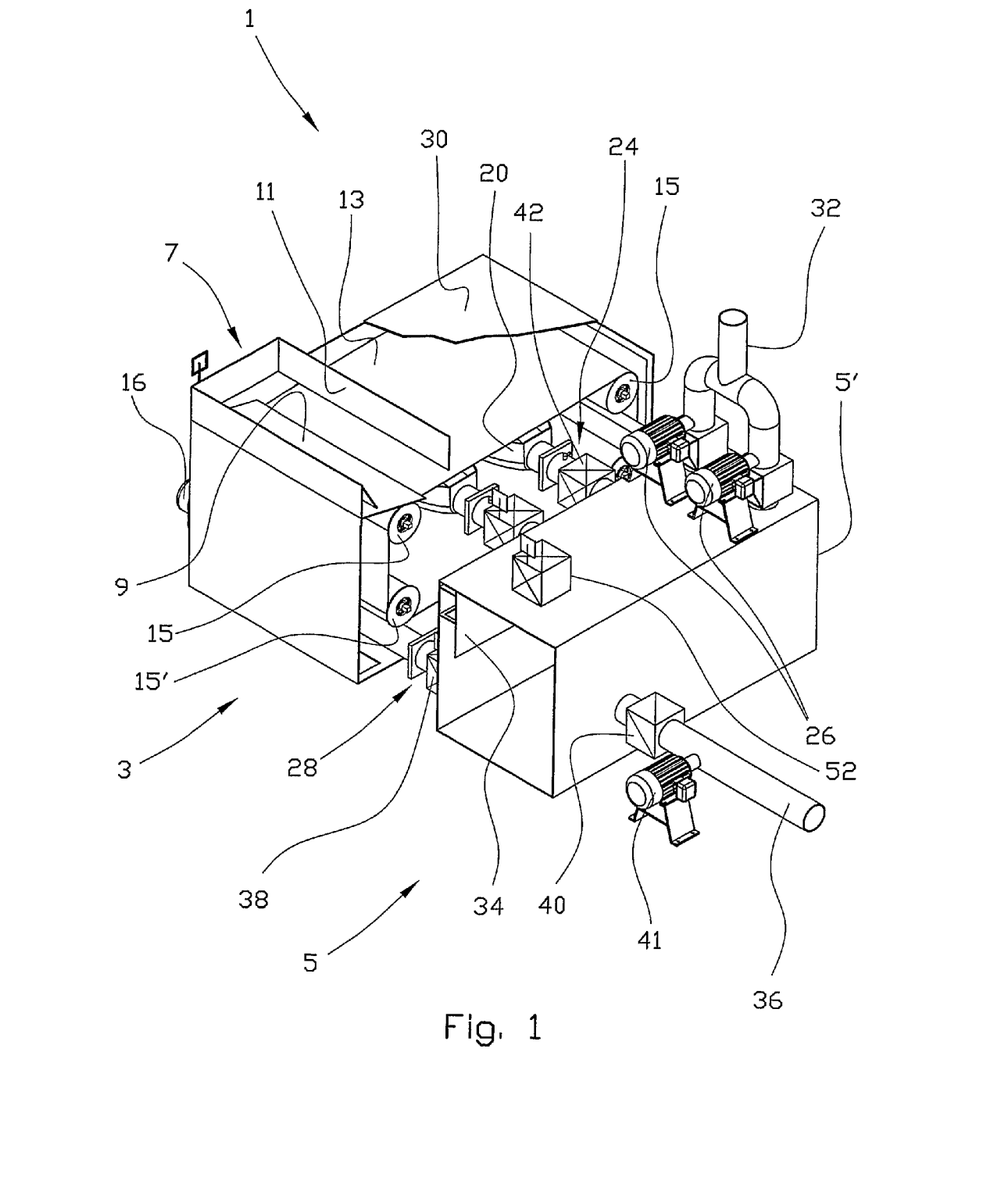
FIG. 1 shows a perspective and partially cut away view, seen at an angle from above, of a sieving and fluid separation apparatus according to the present invention.

In FIG. 1 the sieving unit 3 and fluid separation unit 5 are shown each with one sidewall removed. This is just for illustrative reasons and a person skilled in the art will understand from what follows that the sidewalls must be placed in the respective units 3, 5 for the apparatus 1 to function satisfactorily.

The sieving unit 3 includes a supply portion 7, which is provided with a first stationary sieving device 9. The supply portion 7 is defined by a frame device 11. The material to be treated is supplied to the supply portion 7 and carried by means of the sieving device 9 onto a sieving element 13. The sieving element 13 is formed by an endless sieving cloth which is arranged to be rotated around a pair of upper turning rollers 15 and a pair of lower turning rollers 15'. The turning rollers 15, 15' are disposed parallel to each other and spaced apart.

At least one of the turning rollers 15, 15' has a driving device known per se connected thereto, for example, but not limited to an electromotor 16, to rotate the at least one turning roller 15, 15', thereby moving the sieving element 13. A person skilled in the art will recognize that said electromotor could be replaced with a pneumatic or hydraulic motor. The sieving device 3 is also provided with a tightening device 17 for adjusting the tightening of the sieving element 13 between the turning rollers 15, 15'.

Below a portion of the sieving element 13 and defined between said upper pair of turning rollers 15 are placed two suction nozzles 20. In the exemplary embodiment the suction nozzles 20 are identical and only one is indicated with a reference numeral.

A person skilled in the art will understand that the apparatus 1 of the exemplary embodiments is only shown by means of principle drawings and that the apparatus in a situation of use will have to be connected to a control system known per se and a power supply. Even though the apparatus 1 is shown with only one sieving element 13, it is to be understood that the apparatus could just as well be constituted by two or more sieving devices, which could be placed to overlap completely or partially in the vertical direction. Likewise, it will be understood that one or more of the endless sieving element(s) 13 could be replaced by fixed sieving elements, across which the material to be sieved is passed by means of mechanical means (not shown) or by means of gravitational forces, possibly by means of vibratory/oscillating devices (14) and/or acoustic sound sources (55). (not shown).

Figure 2:
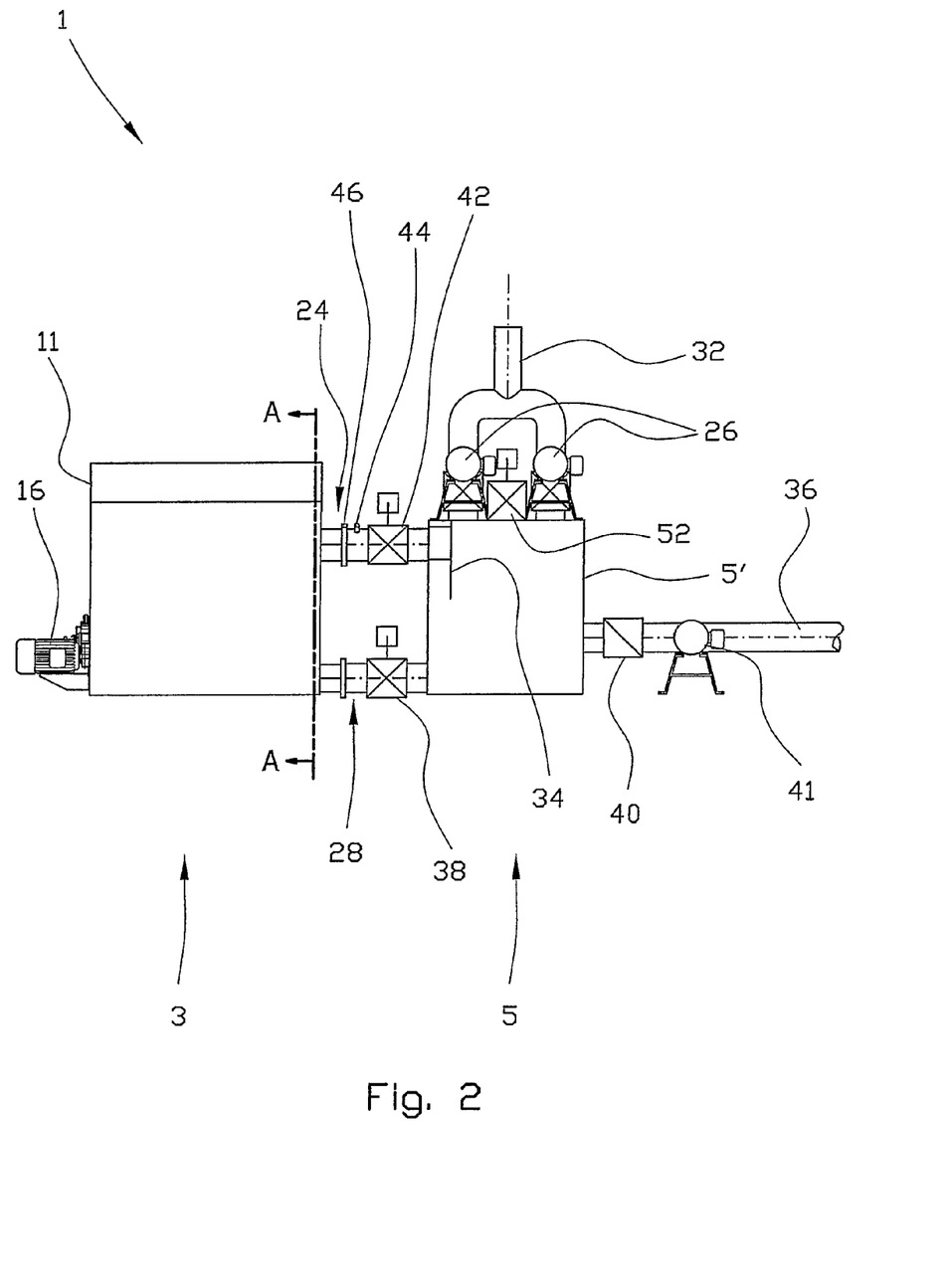
FIG. 2 shows a side view of the apparatus.
Figure 3:
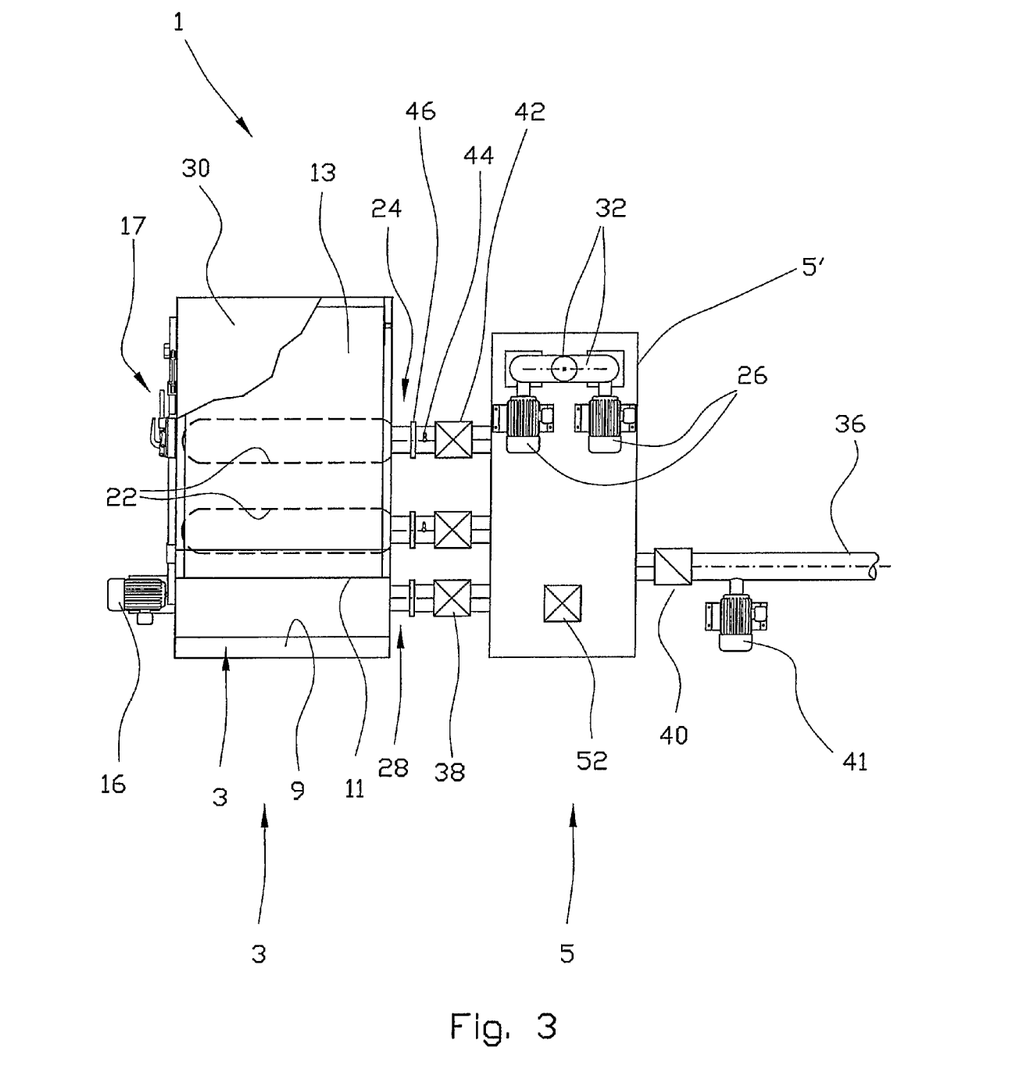
FIG. 3 shows the apparatus of FIG. 1, viewed from above and partially cut away.

In the FIGS. 2 and 3 are shown, respectively, a side view and a plan view of an apparatus 1 in a configuration in which the stationary sieving device 9 is arranged to receive material containing drilling mud and drilled particles and to separate at least some of the drilling mud from the drilled particles. The drilling mud liberated from the material on the sieving device 9 and flowing through it is received in a lower portion of the sieving unit 3. The drilled material is passed on from the sieving device 9 onto the endless sieving element 13.

Figure 5:
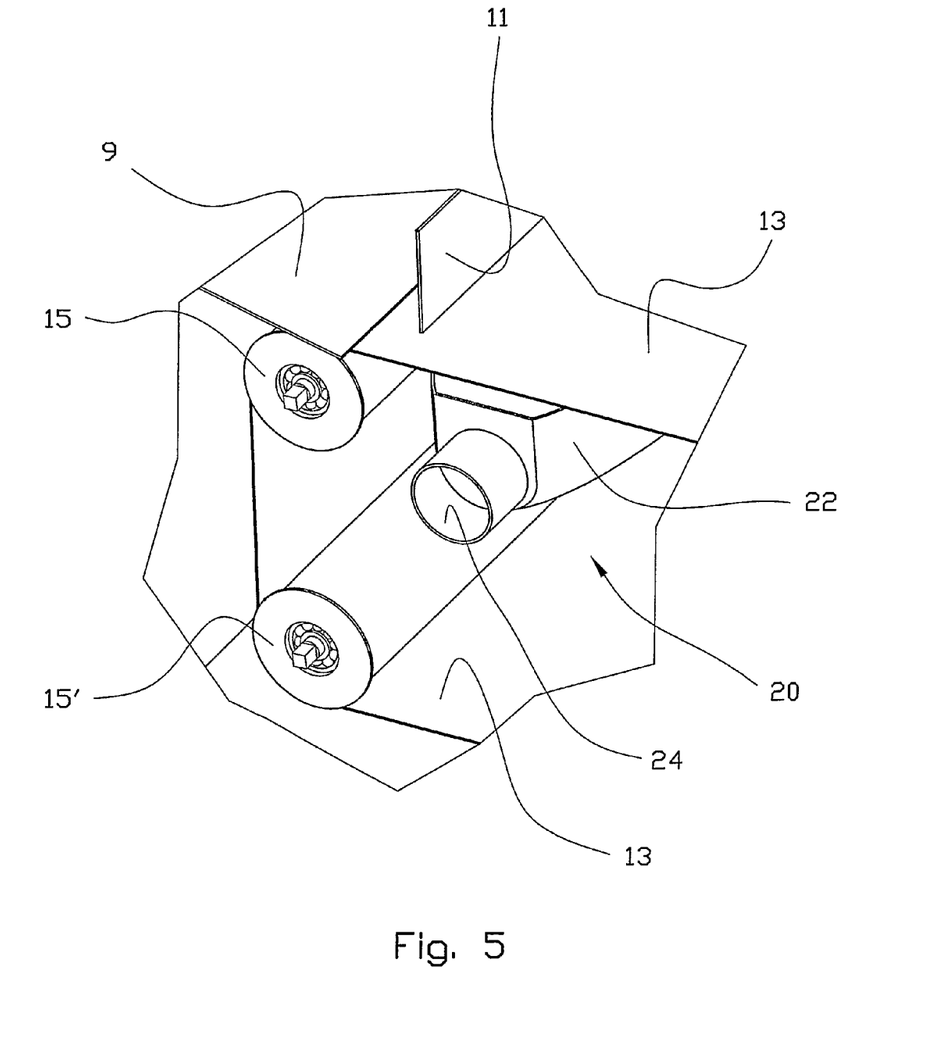
FIG. 5 shows, on a larger scale, a perspective view of a portion of the sieving apparatus of FIG. 1.

Each of the suction nozzles 20 is formed by a trough-like element 22 (see FIG. 5) connected at an end portion to a pipe arrangement 24. In FIG. 3 the suction nozzles 20 are shown extending across the entire width of the sieving element 13.

The pipe arrangement 24 could establish fluid communication between the sieving unit 3 and fluid separation unit 5.

The fluid separation unit 5 is provided with two pumping devices, which are arranged to suck fluid from the top portion of the fluid separation unit 5. In what follows, said pumping devices are termed suction pumps 26.

With the exception of the supply portion 7, an outlet portion for cuttings falling off the sieving element 13, and connected pipe arrangements 24, 28, the sieving unit 3 forms a fluid-tight vessel. For clarity, only a portion of an upper sealing plate 30 is shown placed on a top portion of the sieving unit 3. However, it will be understood that the sealing plate 30 covers the entire top portion of the sieving element 13 with the exception of the supply portion 7.

In the same way as the sieving unit 3, the fluid separation unit 5 is formed by a fluid-tight vessel which is connected to pipe arrangements 24, 28, and further drain pipe arrangements which will be explained in further detail in what follows.

On activation of the suction pumps 26 fluid substantially in a gas phase will be evacuated through the suction pumps 26 into a ventilation system 32 and further to treatment in a manner known per se or disposal. The fluid evacuated from the fluid separation unit 5 is replaced substantially by fluid, which is sucked through the suction nozzles 20 and pipe arrangement 24.

Figure 4:
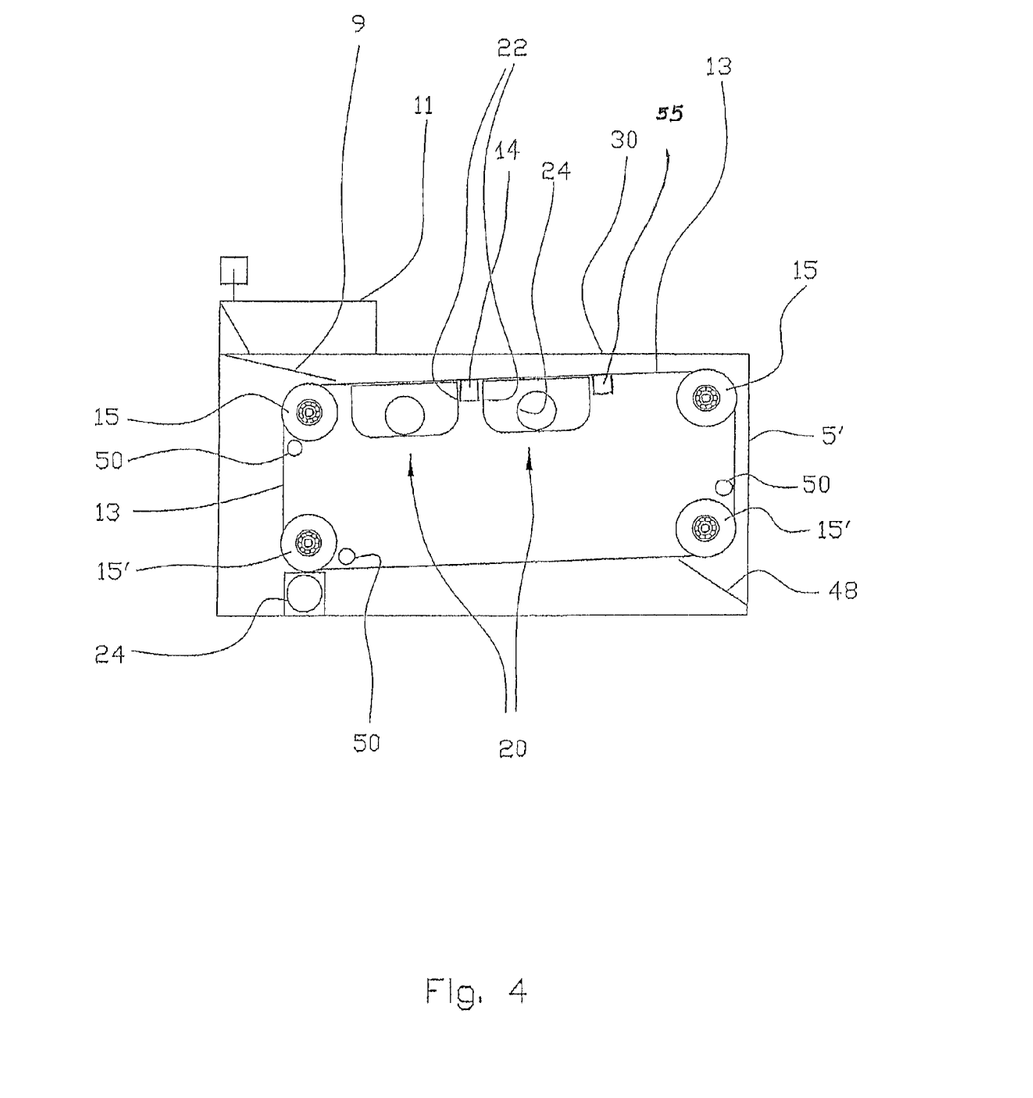
FIG. 4 shows, on a larger scale, a section through the line A-A of FIG. 2.

In the embodiment shown in FIG. 4 the upper end portion of the suction nozzles 20 have been brought to abut onto an underside of the sieving element 13. In an alternative embodiment (not shown) the suction nozzle 20 is provided, at an upper end portion, with roller devices preferably bearing on the underside of the sieving element 13 and, to a significant degree, reducing the friction between and thereby the wear on the sieving element 13 and the upper end portion of the suction nozzle 20. In yet another alternative embodiment (not shown) the suction nozzle 20 is spaced from the underside of the sieving element 13.

Because of the fluid which is evacuated through the suction nozzles 20, a fluid flow is provided from, among other things, the supply portion 7, through the drilled material (not shown) present in the portion of the sieving element 13 located above the suction nozzles 20, and though said portion of the sieving element 13. In trials carried out with a fluid flow of approximately 12 m$^3$/minute through the ventilation system 32, substantial amounts of fluid were drawn or sucked out of the drilled material carried across the sieving element 13. Said fluid, formed by, among other things, drilling fluid and gases from it, and also air, is carried into the fluid separation unit 5. In FIG. 2 is shown in principle a separator plate 34 known per se, which will facilitate the separation of the liquids of the fluid from the gases of the fluid. The liquid which is separated, will be collected at the bottom portion of the fluid separation unit 5, whereas the fluid which is in a gas or vapour phase will be sucked out of the fluid vessel 5 through the suction pumps 26 to the ventilation system 32.

The liquid collected in the bottom portion of the sieving unit 3 could be passed on via a pipe arrangement 28 into the bottom portion of the fluid separation unit 5, by means of, for example, a pump not shown. From the fluid separation unit 5 the liquid is pumped by means of a pump 41 into a drainpipe arrangement 36 and to, for example, further treatment and reuse. Such a pumping out is preferably controlled by means of control devices and valve arrangements known per se. In the FIGS. 1-3 one control valve 38 is shown to be placed in the pipe arrangement 28 and one check valve 40 is shown to be placed in the drainpipe arrangement 36.

The pipe arrangements 24 providing fluid communication between the suction nozzles 20 and fluid separation unit 5 are shown to be provided with a shut-off valve 42 each. One of the purposes of the shut-off valve 42 is to shut off communication between the suction nozzle 20 of the sieving unit 3 and the fluid separation unit 5 if the fluid flow carries particulate material such as, but not limited to, cuttings in the cases of ruptures in the sieving element 13 or for other reasons. A sensor device such as, but not limited to, a flow sensor 44 and a particle filter 46 are placed at each of the pipe arrangements 24. If the particle filter 46 gets clogged up at least partially, the flow sensor 44 may output a signal, in a manner known per se, to an activating mechanism (not shown) for activating the shut-off valve 42. Similarly, the control valve 38 of the pipe arrangement 28 could be controlled.

A person skilled in the art will recognize that further or alternative valve or pump arrangements known per se could be integrated into the pipe arrangements 24, 28, 36. Further, it will be understood that the drainpipe arrangement 36 and valve system 32 are preferably connected to further apparatuses (not shown).

The drilled material conveyed from the supply portion across the sieving unit 13 between the upper turning rollers 15, falls off and is carried in a manner known per se via a drain tray 48 out of the sieving unit 3 and to, for example, collection for transport for disposal on shore.

To be able to control and to maintain constant underpressure in the fluid separation unit 5, the fluid separation unit 5 is provided with an underpressure valve 52 of a kind known per se.

Even though in the figures only two suction nozzles 20 are shown for the sieving unit 3, it will be understood that a different number from the number of suction nozzles 20 shown is also covered by the present invention.

In FIG. 4 is indicated in principle a cleaning device in the form of cleaning nozzles 50 placed towards portions of the endless sieving element 13. The purpose of the cleaning nozzles 50 is to direct a fluid flow, preferably air/gas recovered from the interior of the sieving device 3, through a portion of the sieving element 13 to release particulate material that has stuck to the sieving element 13. The fluid flow is directed towards the sieving element 13 preferably from the underside, in the position of use, of the sieving element 13 and preferably upstream of the movement of the sieving element 13 around the individual turning roller 15, 15'. By the use of such cleaning nozzles 50 the sieving element 13 may maintain its sieving capacity to the greatest extent possible. As necessary apparatus, necessary for providing such cleaning nozzles 50, is well known to a person skilled in the art, this will not be described in any further detail herein.

Drilled material from the drilling of a petroleum well may contain substances that are unfavourable to the health. Some of these substances are liberated from the drilled material during the cleaning process. A substantial advantage of the sieving and fluid separation apparatus 1 in accordance with the present invention is that the apparatus is encapsulated and any undesirable gases and vapours liberated during the cleaning process are collected and carried away in a controlled manner from the sieving and fluid separation apparatus 1 and to possible further treatment and/or release into the atmosphere at a location remote from the personnel. A further, substantial advantage of the present invention is that the apparatus provides two apparatuses which could be handled as one unit and which, compared with prior art apparatuses, take up very little of the already limited area available on, for example, an offshore installation.

Further advantages of the present invention relate to the capacity of the sieving apparatus 1 with respect to the ability to separate fluid from solids and to separate fluid into a gas phase and liquid phase and environmental aspects related to vibrations and noise. Trials have shown that a sieving and fluid separation apparatus 1 in accordance with the present invention could satisfactorily clean 2000-3000 liters of drilling fluid per minute.

The invention claimed is:

1. A sieving and fluid separation apparatus for processing a material containing fractions of fluid and solid particles, the apparatus comprising:
   a sieving unit capable of filtering the fluid and the solid particles from the material, and
   a separating unit capable of separating fluid components received from the sieving unit, wherein said sieving unit being located in a first substantially fluid-tight vessel, said separating unit being located in a second substantially fluid-tight vessel, and the first and second vessels being interconnected by means of a pipe arrangement,
   wherein the sieving unit comprises:
   a material supply portion,
   an endless movable web of sieve cloth communicating with the material supply portion for receiving material onto an upper face of the web, said endless web passing over at least two spaced-apart rotary rollers, yielding an upper path and a lower path of the web,
   a roller drive motor engaging a roller for rotation thereof,
   a trough-like suction device facing at least part of a lower face of the upper path of the web, the suction device communicating via said pipe arrangement with a suction pump device located on the second vessel of the separating unit to deliver by suction fluid components filtered from said material through the upper path of the web into the separating unit in the second vessel, and
   an outlet to remove from the sieving unit the filtered solid particles delivered by the movable web to the outlet, and
   wherein the separating unit comprises:
   a separator device inside the second vessel,
   a first pipe outlet means of the pipe arrangement facing the separator device to enable filtered fluid components passing from the suction device via the pipe arrangement to meet the separator device to reduce the fluid velocity and facilitate separation of the fluid components into liquid and gas thereof,
   a ventilation system provided at a top of the second vessel and in communication with said suction pump device and thereby an interior space of the second vessel to withdraw said separated gas therefrom, and
   a drain pipe communicating with the interior space of the second vessel to drain said separated liquid to a location outside the second vessel.

2. The apparatus according to claim 1, wherein the pipe arrangement comprises first and second pipe devices, wherein the first pipe device is located at upper regions of said first and second vessels and linking the suction device with said first pipe outlet means, and wherein the second pipe device is located at lower regions of said first and second vessels to drain any fluid of the material entered into the bottom of the first vessel into the second vessel to subsequently exit therefrom as liquid through said drain pipe and gas through said ventilation system.

3. The apparatus according to claim 2, wherein the suction device comprises at least two suction troughs, and wherein the first pipe device comprises at least two pipes from respective ones of said suction troughs, said at least two pipes forming said first pipe outlet means of the pipe arrangement.

4. The apparatus according to claim 2, wherein said first pipe device is provided with a particle filter upstream of the flow sensor and the shut-off valve.

5. The apparatus according to claim 2, wherein the second pipe device is provided with a control valve.

6. The apparatus according to claim 2 further comprising in a pipe of said first pipe device a shut-off valve and a flow sensor, said shut-off valve being controlled by said flow sensor.

7. The apparatus according to claim 1 further comprising a pumping device operatively connected with said drain pipe from the second vessel.

8. The apparatus according to claim 7, wherein a check valve is attached in the drain pipe upstream of the pumping device.

9. The apparatus according to claim 1 further comprising a stationary, inclined sieving element in the material supply portion.

10. The apparatus according to claim 1, further comprising a cleaning device facing a rear side of said web downstream of said upper path to clean at least one portion of said sieving cloth web, said cleaning device comprising at least one or more cleaning nozzles directing a fluid flow through said web at said at least one portion to release any particulate material stuck to the sieving web.

11. The apparatus according to claim 10, wherein said cleaning fluid is air or gas extracted from the second vessel through the ventilation system.

12. The apparatus according to claim 10, wherein a cleaning nozzle is located upstream of all web rollers except the roller located at a downstream end of the upper path of the web.

13. The apparatus according to claim 1, wherein a drain tray is located at said solid particles outlet at a bottom region inside the first vessel.

14. The apparatus according to claim 1, wherein the suction device extends over the full width of the lower side of the upper path of sieve cloth web.

15. A method enabling sieving and fluid separation when processing a material containing fractions of fluid and solid particles, the method comprising:

delivering into a sieving unit located in a first substantially fluid-tight vessel said material onto an endless moving sieve cloth web, filtering in the sieving unit by suction at a suction device the fluid away from the material, sucking fluid components filtered by the sieving unit into a second substantially fluid-tight vessel via a first pipe device of a piping arrangement which interconnects the suction device in the first vessel with a fluid separator device in the second vessel, separating in the fluid separator device the fluid components into liquid and gas, letting said liquid and gas exit the second vessel at separate locations, delivering the solid particles left on the web, subsequent the filtering, to a solid particles outlet of the first vessel; and wherein fluid filtered from the material and which is not conveyed from the first vessel to the second vessel by suction, is collected in a bottom region of the first vessel and via a second pipe device of the piping arrangement delivered to a bottom region of the second vessel to exit therefrom as liquid and gas components.

\* \* \* \* \*